H. C. SERGEANT.

ROCK DRILL.

No. 7,381.

REISSUED NOV. 7, 1876.

2 SHEETS—SHEET 1.

Witnesses

C. M. Connell

Wm. R. Singleton

Inventor

Henry C. Sergeant

Per Blanchard & Singleton

Attys

H. C. SERGEANT.

ROCK DRILL.

No. 7,381. REISSUED NOV. 7, 1876.

2 SHEETS—SHEET 2.

Witnesses

C. M. Connell

Wm. R. Singleton

Inventor

Henry C. Sergeant

Per Blanchard & Singleton

Attys

UNITED STATES PATENT OFFICE.

HENRY C. SERGEANT, OF NEW YORK, N. Y., ASSIGNOR TO THE INGERSOLL ROCK DRILL COMPANY.

IMPROVEMENT IN ROCK-DRILLS.

Specification forming part of Letters Patent No. 140,596, dated July 8, 1873; reissue No. 7,381, dated November 7, 1876; application filed August 22, 1876.

*To all whom it may concern:*

Be it known that I, HENRY C. SERGEANT, of New York, in the county of New York and State of New York, have invented certain new and useful Improvements in Rock-Drills; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My improvement relates to that class of rock-drills known as the "percussion," having a steam or air cylinder with drill attached to one end of the piston-rod, the parts being arranged so as to combine simplicity with durability.

My invention consists in providing for cushioning the piston of a rock-drill by placing within the cylinder thereof an elastic cushion, so arranged as to prevent the piston from coming in contact with the head of the cylinder at either end thereof, in the event of any derangement of any of the parts of the valve motion, or of the breaking of the drill; and it further consists in the construction, combination, and arrangement of certain other parts of the device, as will be more fully explained hereinafter.

I have also arranged, for the better protection of the parts, a cushion of rubber or some other suitable material, so that it can be used for the double purpose of cushion and packing to the piston-rod.

The manner of revolving the drill, the automatic feed, the frame or tripod, and the clamp, are all portions of my improvement.

The parts being shown in the accompanying drawings with corresponding letters of reference, as seen in the different views, I now proceed to describe their construction and operation.

Figure 1:
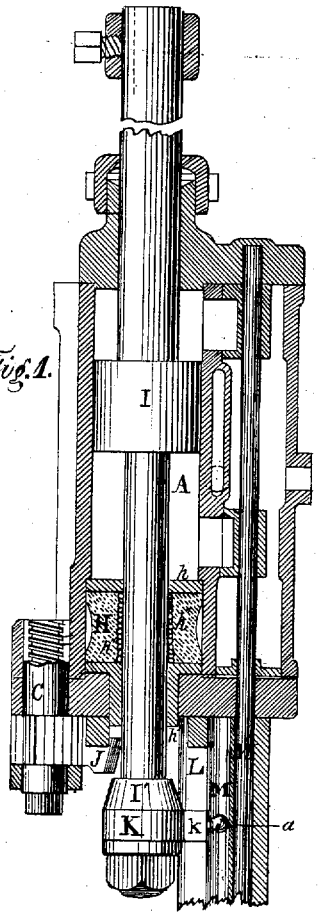
Figure 3:
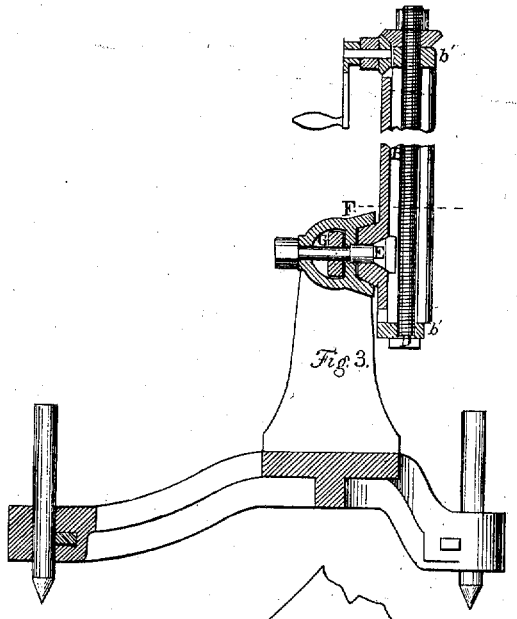
Figure 2:
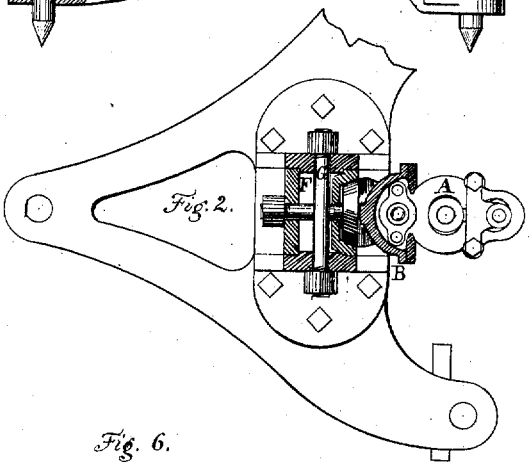

The cylinder A, as seen in Figures 1 and 2, is arranged to slide in guides fastened to the back, shown by letter B, in Figs. 2 and 3. The cylinder can be raised or lowered by means of the screw running the whole length of the back, and passing through the nut attached to the cylinder, shown at C in Fig. 1. Bevel-wheels with crank are used for convenience in turning the screw by hand, the nut C being stationary when the screw is being revolved. The back B has two heads or ends bolted to it, and so arranged that they can be taken off and reversed, thus enabling the operator to use either the long or the short end of the back toward the drill. For open cutting, the short end would be used, as shown in Fig. 3. For tunneling, the long end would be used. The feed-screw D passes through the heads of the back, and by turning the nut on the upper end the screw is made fast, and prevented from revolving, also adding strength and solidity to the back, all the strain coming direct on the heads. The back is cast with a cone on it near one end, arranged to receive one large bolt through the center of the cone. (Shown by letter E in Fig. 3.) This cone has a corresponding piece cast to receive it, so that by screwing up the nut the back is held solid to the frame or female part of the clamp. (Shown by letter F in Figs. 2 and 3.) The clamp is supported by two upright pieces bolted to a base, so arranged that it can be leveled by three adjustable points fastened to the desired positions by keys. The bolt G (shown in Figs. 2 and 3) is for the purpose of closing the two upright pieces, and holding the female portion of the clamp fast.

This arrangement of frame, clamp, and back enables the operator to adjust the drill to any desired position, by simply operating the two bolts E and G.

Figure 13:
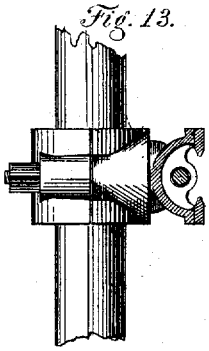

The drawings, Fig. 13, represent the form of clamp to be used in tunneling, and the manner of attaching the back to the clamp, and the clamp to the arm which supports the drill.

The cylinder A is made of cast-iron, or any suitable material, bored out, and having two heads fitted and fastened to it, and a piston, I, fitted with a rod extending out through both heads, one end of which is used for clamping the drill. The other is used for operating the valves, and feeding and revolving the drill.

Within the cylinder is formed a cushion, H, which serves the double purpose of a packing-box to the piston-rod, and preventing the piston from striking either head of the cylinder. This cushion is constructed in the following manner: The cylinder has a recess sufficient to form a bearing for a ring, *h*, fitting around the piston-rod, leaving a space suitable to receive a ring, *h''*, of rubber or some other elastic substance around it, and inside of the cylinder. Between the rubber and piston-rod, I insert cotton or hemp, or any substance that will afford less friction than the rubber, for the purpose of making a steam-tight joint, and keeping the oil from, and preventing the wear of, the cushion. Behind this I insert a second flange-ring, *h'*, into the end of the cylinder, which has a boss of sufficient length to project through the cylinder-head, which is fastened to the cylinder by means of screws holding the packing-rings *h h'* and cushion firmly in their place.

If, by any accident, the movement of the drill should not be arrested at the proper time by the steam in the cylinder, or by the drill striking the rock, it would be stopped by the cone I' coming in contact with the flange-ring *h'*, which will be forced upon the cushion inside of the cylinder, and in the opposite stroke by the piston I striking the cushion in the reverse direction.

This last-named method of arresting the movements of the drill will not be brought into requisition while the drill is cutting and the feed and valves working properly.

The automatic feed is obtained in the following manner: The cone I' is attached firmly to the piston-rod, working closely to the pawl J, which has an inclined surface corresponding with the cone J'. When the drill has cut the rock sufficiently to allow the piston to pass a little farther or make the stroke a little longer, the cone will come in contact with the incline of the pawl and force it from the piston-rod. The end of the pawl working in the ratchet-wheel turns the nut around, which works in bearings fastened to the body of the cylinder, the screw being stationary at the time the cylinder and drill are fed out or down, as the case may be. When the piston is moved back the pawl is returned to its original place by means of a spring, *j*, and, if necessary, will feed one or more teeth on the ratchet-wheel at each stroke of the drill.

The piston and drill are made to reciprocate and revolve in the following manner: The short arm K is firmly attached to the piston-rod by means of a nut at its outer end. A portion, *k*, of the arm K moves between two parallel inclined surfaces, which are fastened firmly upon the cylinder-head. (See letter L in Figs. 1, 4, and 8.) The extreme end *a* of the arm K moves in a slotted sleeve, M, surrounding and fastened to the valve-rod M', and is made long enough for the arm K to continue in the slot the entire length of the stroke of the piston.

The valve-chamber is cylindrical, and contains two partially-rotating valves attached to one rod.

Figs. 1, 9, 11, and 12 show the inlet and outlet passages of the valve-chamber and cylinder.

Figure 10:
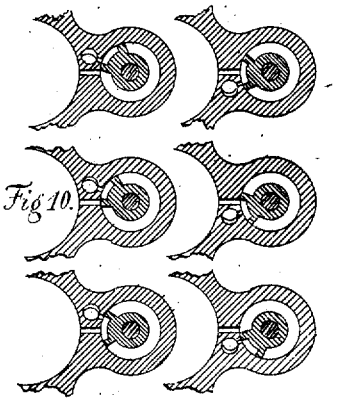
Figure 10:
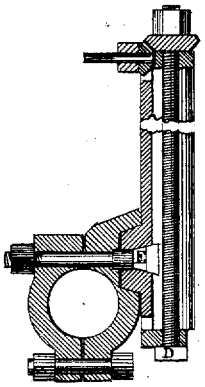

Fig. 10 shows the two valves in their different positions, and their relation to each other during the different portions of the stroke of the piston.

By admitting steam to the cylinder through the valve-chamber the piston is driven from one end of the cylinder to the other.

Figures 4, 5:
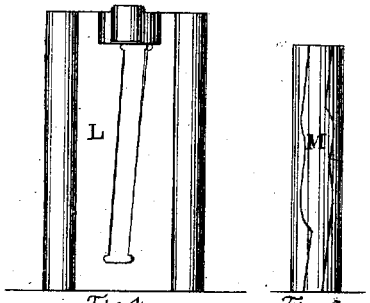
Figure 6:
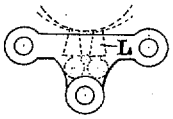
Figure 7:
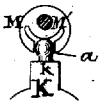
Figure 12:
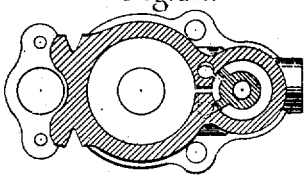
Figure 9:
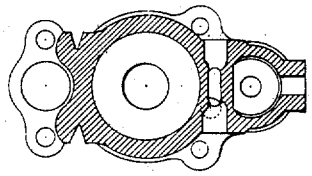
Figure 11:
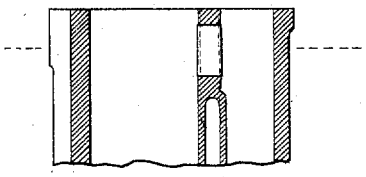

The arm K has a reciprocating movement imparted to it by the movements of the piston, and a partially-rotative movement caused by the inclined surfaces L, Figs. 1 and 4. The extreme end of the arm K causes the valves to partially rotate, thereby, at the proper time, reversing the pressure upon the piston and giving it a return stroke.

The peculiar form of the slot in the sleeve M attached to the valve-stem controls the motion of the valves, it being formed by being cast upon a chill, and can be varied to give any motion to the valve that may be required.

Figure 8:
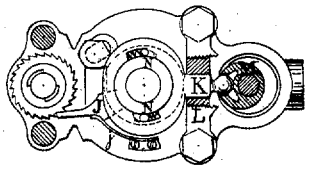

N N in Fig. 8 represent two round steel pieces, operating on two inclines cut out of the arm K on the side next to the piston-rod, they being held to their proper place by means of two spiral springs. This is to form a friction-clutch, which gives a rotating motion to the piston by forming a connection with the partially-rotating arm K at each alternate stroke of the piston.

What I claim as new, and desire to secure by Letters Patent, is—

1. The base or tripod of cast-iron, with two upright pieces, forming a jaw for holding the clamp F, in combination with the adjustable feet, operating substantially as shown and described.

2. The cone on the back B of a rock-drill, in combination with the socket F, made to receive the cone, they being bolted together, substantially as shown, and for the purpose described.

3. The reversible ends *b' b'*, in combination with the extended feed-screw D, so as to allow reversing and bolting together, as shown and described.

4. The combination of the crank, bevel-wheels, reversible ends, and feed-screw, operating substantially as described.

5. The arm K, working between the flanges or collars, and having a reciprocating and oscillating motion, in combination with the stationary spiral incline L and sleeve M, for the purpose shown and described.

6. The elastic cushion and packing-box H, constructed and operated as shown and described.

7. In a rock-drill, an elastic cushion placed within the steam-space of the cylinder, in combination with the piston, whereby said cushion is made to arrest the movements of the piston and drill at either end of the cylinder, substantially as described.

8. The metal ring placed between the piston-head and cushion, and arranged to receive the blow, thereby protecting the elastic cushion from being destroyed.

In testimony that I claim the foregoing I have hereunto set my hand this 10th day of August, 1876.

HENRY C. SERGEANT.

Witnesses:
THOMAS C. CONNOLLY,
HENRY H. BURTON.